(12) United States Patent
Mori et al.

(10) Patent No.: US 11,754,330 B2
(45) Date of Patent: Sep. 12, 2023

(54) REFRIGERATION CYCLE APPARATUS

(71) Applicant: Mitsubishi Electric Corporation, Tokyo (JP)

(72) Inventors: Yuki Mori, Tokyo (JP); Masashi Fujitsuka, Tokyo (JP); Takahiro Nakai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 209 days.

(21) Appl. No.: 17/428,978

(22) PCT Filed: Mar. 11, 2019

(86) PCT No.: PCT/JP2019/009660
§ 371 (c)(1),
(2) Date: Aug. 6, 2021

(87) PCT Pub. No.: WO2020/183560
PCT Pub. Date: Sep. 17, 2020

(65) Prior Publication Data
US 2022/0136751 A1 May 5, 2022

(51) Int. Cl.
*F25B 49/02* (2006.01)
(52) U.S. Cl.
CPC .................. *F25B 49/022* (2013.01)
(58) Field of Classification Search
CPC .................................................. F25B 49/022
See application file for complete search history.

(56) References Cited

U.S. PATENT DOCUMENTS

| | | |
|---|---|---|
| 2005/0210897 A1 | 9/2005 | Oomura et al. |
| 2018/0010834 A1 | 1/2018 | Fujitsuka et al. |

FOREIGN PATENT DOCUMENTS

| | | |
|---|---|---|
| EP | 3208550 A1 | 8/2017 |
| EP | 3267127 A1 | 1/2018 |
| EP | 3306204 A1 | 4/2018 |

(Continued)

OTHER PUBLICATIONS

Extended European search report dated Jan. 24, 2022, in corresponding European patent Application No. 19918608.1, 8 pages.

(Continued)

*Primary Examiner* — Nael N Babaa
(74) *Attorney, Agent, or Firm* — XSENSUS LLP

(57) ABSTRACT

The present invention has an object to provide a refrigeration cycle apparatus. A refrigeration cycle apparatus according to the present invention includes: a compressor; and a control apparatus configured to calculate a rotation number command of the compressor. The control apparatus includes a capacity controller configured to calculate the rotation number of the compressor as a capacity rotation number, a protection controller configured to calculate the rotation number of the compressor as a protection rotation number and a rotation number selection unit configured to select any one of the capacity rotation number and the protection rotation number as the rotation number command of the compressor. The rotation number command of the compressor is calculated so that at least any one of causing the current capacity value to approach the capacity target value and causing the protection variable to approach the protection target value is satisfied.

7 Claims, 13 Drawing Sheets

(56) References Cited

FOREIGN PATENT DOCUMENTS

| | | | |
|---|---|---|---|
| JP | 4-103968 | A | 4/1992 |
| JP | 5-60403 | A | 3/1993 |
| JP | 10-19390 | A | 1/1998 |
| JP | 11-159835 | A | 6/1999 |
| JP | 11-337234 | A | 12/1999 |
| JP | 2003-326958 | A | 11/2003 |
| JP | 2005-16753 | A | 1/2005 |
| JP | 2005-140411 | A | 6/2005 |
| JP | 2008-202905 | A | 9/2008 |
| JP | 2015-94504 | A | 5/2015 |
| JP | 2016-80317 | A | 5/2016 |
| WO | 2016/194397 | A1 | 12/2016 |

OTHER PUBLICATIONS

International Search Report and Written Opinion dated May 21, 2019, received for PCT Application PCT/JP2019/009660, Filed on Mar. 11, 2019, 11 pages including English Translation.
Chinese Office Action dated Jun. 16, 2022, in corresponding Chinese Application No. 201980093513.2, 20 pp.

F I G. 1
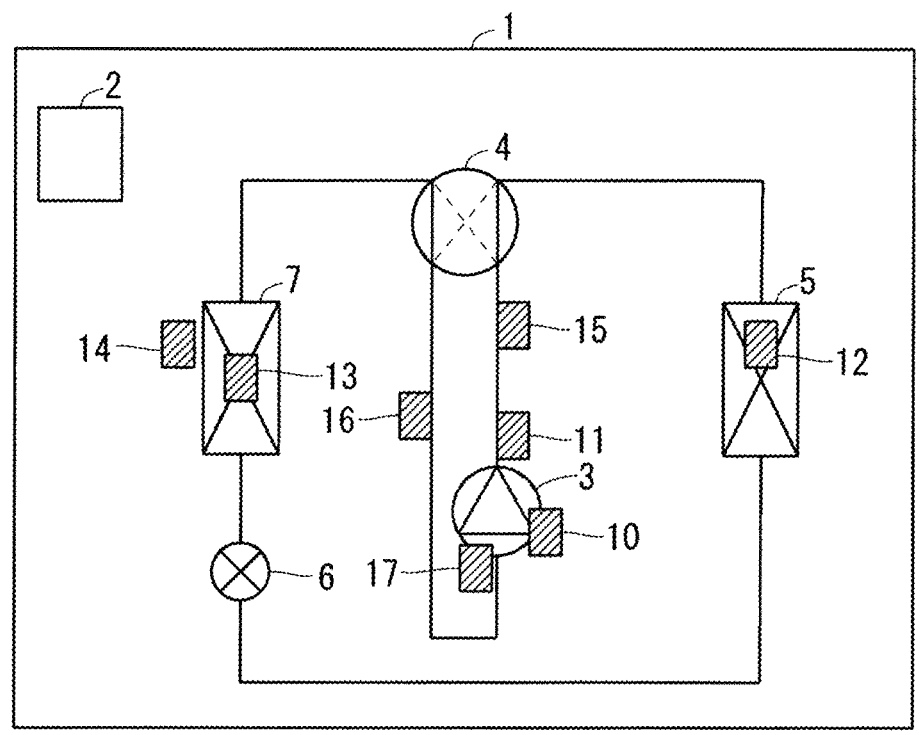

F I G. 3
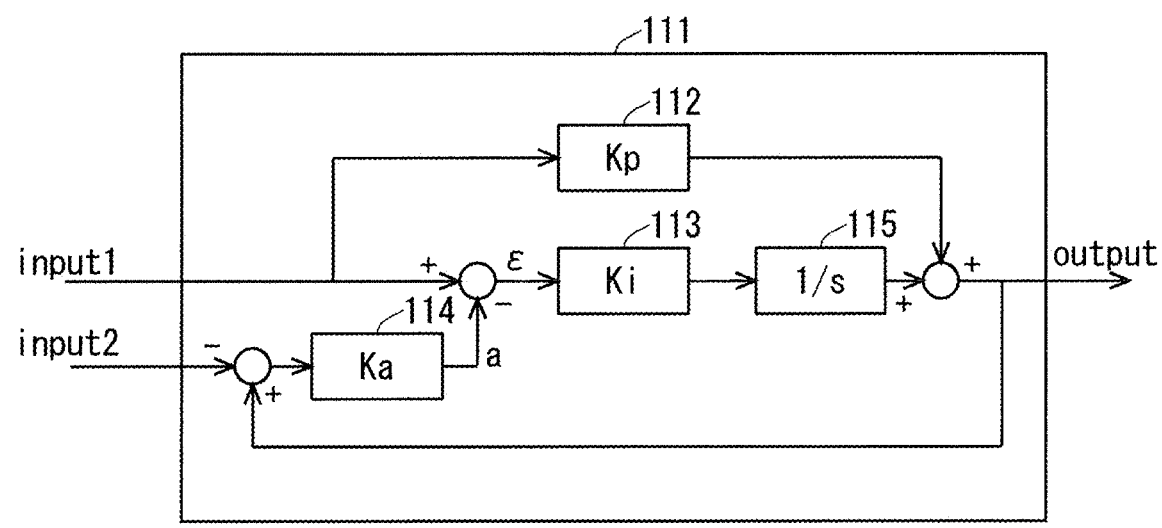

F I G. 6
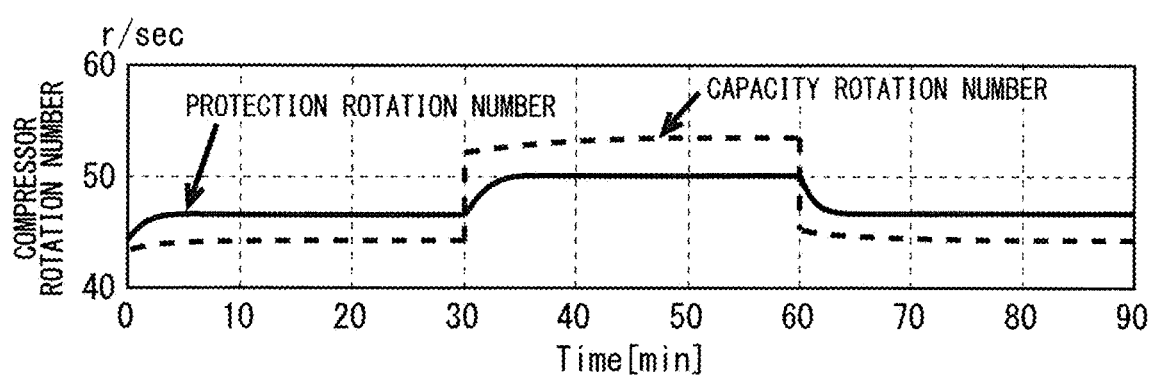

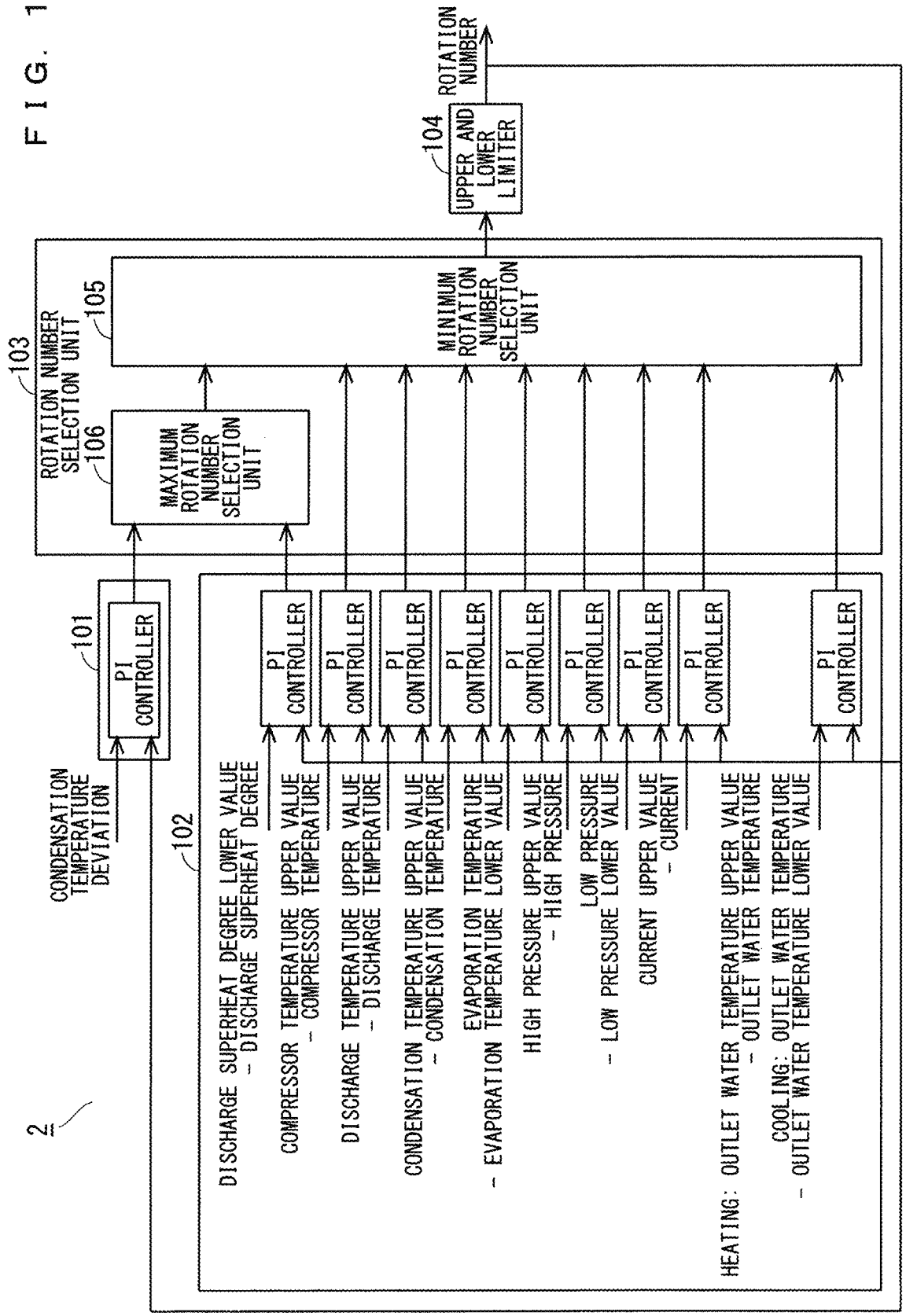

FIG. 13

- EVAPORATION TEMPERATURE DEVIATION → PI CONTROLLER (101)
- DISCHARGE SUPERHEAT DEGREE LOWER VALUE − DISCHARGE SUPERHEAT DEGREE → PI CONTROLLER
- COMPRESSOR TEMPERATURE UPPER VALUE − COMPRESSOR TEMPERATURE → PI CONTROLLER
- DISCHARGE TEMPERATURE UPPER VALUE − DISCHARGE TEMPERATURE → PI CONTROLLER
- CONDENSATION TEMPERATURE UPPER VALUE − CONDENSATION TEMPERATURE → PI CONTROLLER
- EVAPORATION TEMPERATURE LOWER VALUE − EVAPORATION TEMPERATURE → PI CONTROLLER
- HIGH PRESSURE UPPER VALUE − HIGH PRESSURE → PI CONTROLLER
- LOW PRESSURE LOWER VALUE − LOW PRESSURE → PI CONTROLLER
- CURRENT UPPER VALUE − CURRENT → PI CONTROLLER
- HEATING: OUTLET WATER TEMPERATURE UPPER VALUE − OUTLET WATER TEMPERATURE
- COOLING: OUTLET WATER TEMPERATURE − OUTLET WATER TEMPERATURE LOWER VALUE → PI CONTROLLER (102)

ROTATION NUMBER SELECTION UNIT (103)
- MAXIMUM ROTATION NUMBER SELECTION UNIT (106)
- MINIMUM ROTATION NUMBER SELECTION UNIT (105)

→ UPPER AND LOWER LIMITER (104) → ROTATION NUMBER

2

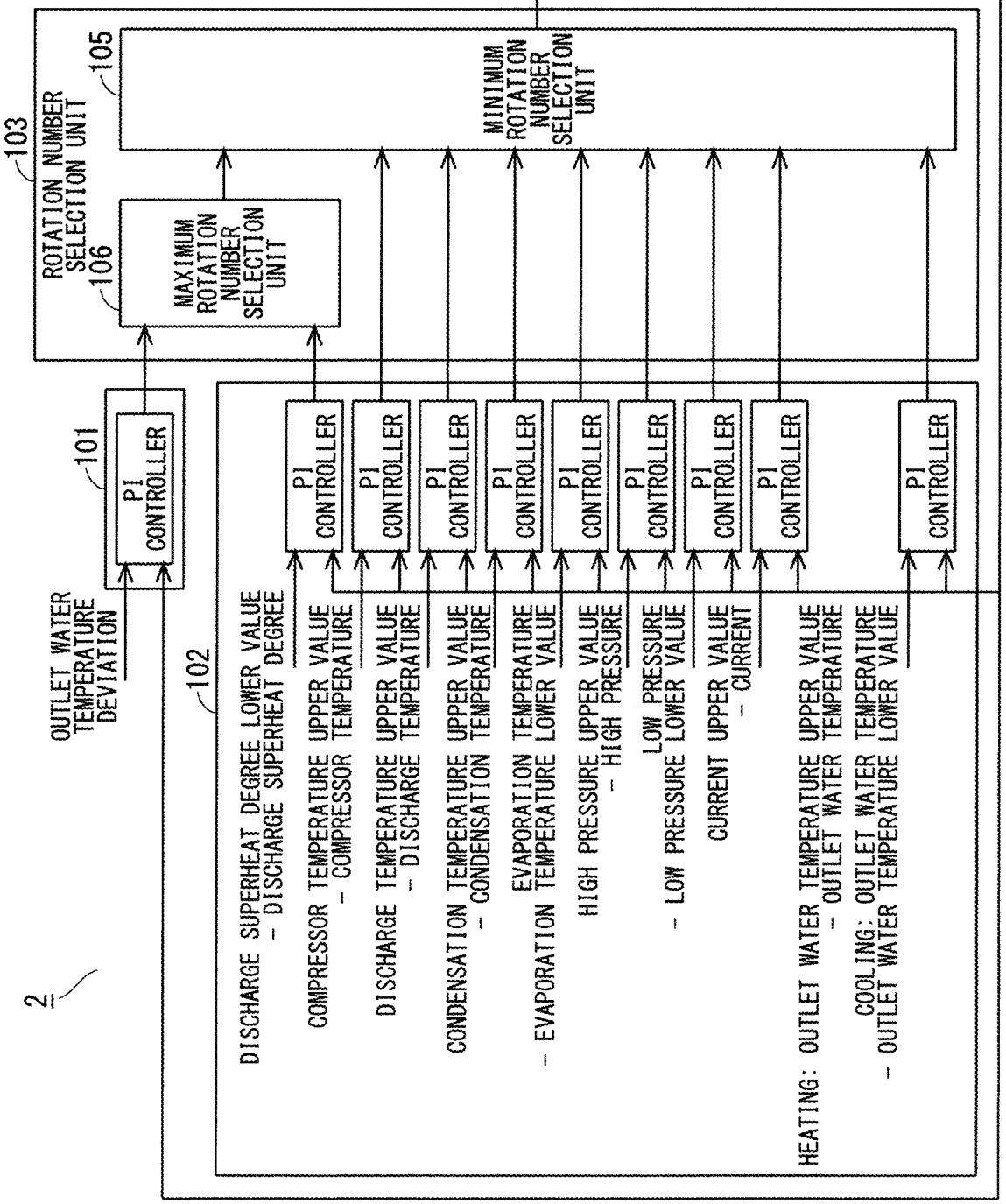

REFRIGERATION CYCLE APPARATUS

CROSS-REFERENCE TO RELATED APPLICATION

The present application is based on PCT filing PCT/JP2019/009660, filed Mar. 11, 2019, the entire contents of which are incorporated herein by reference.

TECHNICAL FIELD

The present invention relates to a refrigeration cycle apparatus using a vapor compression refrigeration cycle, and more particularly to a refrigeration cycle apparatus including a compressor whose rotation number is a variable.

BACKGROUND ART

A control apparatus of a refrigeration cycle apparatus as follows has hitherto been disclosed: specifically, the control apparatus calculates a speed command of an inverter motor adapted for a load by using PI control or the like, and in order to reduce high pressure of refrigerant to an allowable value, calculates an upper limit speed of the speed command of the inverter motor in reference to a graph, based on a limited value of the high pressure and detected pressure on the high pressure side (for example, see Patent Document 1).

PRIOR ART DOCUMENTS

Patent Documents

Patent Document 1: Japanese Patent Application Laid-Open No. 2005-16753

SUMMARY

Problem to be Solved by the Invention

The control apparatus disclosed in Patent Document 1 does not consider the fact that the upper limit speed for reducing the high pressure of refrigerant to an allowable value changes from moment to moment due to influences such as changes in an ambient environment, variation of performance of devices constituting the refrigeration cycle apparatus, and aging of the refrigeration cycle apparatus. Thus, depending on an operation condition of the refrigeration cycle apparatus, the upper limit speed of the speed command of the inverter motor calculated by the control apparatus may be much faster or much slower than the original upper limit speed. As a result, there is a problem in that, when the upper limit speed of the speed command of the inverter calculated by the control apparatus exceeds the original upper limit speed, failure is more likely to occur in the devices constituting the refrigeration cycle apparatus. Further, there is a problem in that, when the upper limit speed of the speed command of the inverter calculated by the control apparatus falls below the original upper limit speed, capacity of the refrigeration cycle apparatus deteriorates.

The present invention is made in order to solve the problems as described above, and has an object to provide a refrigeration cycle apparatus that can optimally control capacity.

Means to Solve the Problem

In order to solve the problems described above, a refrigeration cycle apparatus according to the present invention includes: a compressor whose rotation number is a variable; and a control apparatus configured to calculate a rotation number command of the compressor for handling the rotation number of the compressor. The control apparatus includes a capacity controller configured to calculate the rotation number of the compressor as a capacity rotation number in order to cause a current capacity value indicating current capacity of the refrigeration cycle apparatus to be a capacity target value being determined at suitable time, a protection controller configured to calculate the rotation number of the compressor as a protection rotation number in order to cause a protection variable being a variable related to a limitation item including protection of the refrigeration cycle apparatus to be a protection target value being determined at suitable time, and a rotation number selection unit configured to select any one of the capacity rotation number calculated by the capacity controller and the protection rotation number calculated by the protection controller as the rotation number command of the compressor. The rotation number command of the compressor is calculated so that at least any one of causing the current capacity value to approach the capacity target value and causing the protection variable to approach the protection target value is satisfied.

Effects of the Invention

According to the present invention, the refrigeration cycle apparatus includes the compressor whose rotation number is a variable, and the control apparatus that calculates the rotation number command of the compressor for handling the rotation number of the compressor. The rotation number command of the compressor is calculated so that at least any one of causing the current capacity value to approach the capacity target value and causing the protection variable to approach the protection target value is satisfied. Therefore, the capacity of the refrigeration cycle apparatus can be optimally controlled.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a schematic diagram illustrating an example of a configuration of an air conditioning apparatus according to the first embodiment of the present invention.

FIG. 3 is a block diagram illustrating an example of a configuration of a PI controller according to the first embodiment of the present invention.

FIG. 6 is a diagram for illustrating operation of the air conditioning apparatus according to the first embodiment of the present invention.

FIG. 12 is a block diagram illustrating an example of a configuration of the control apparatus according to the sixth embodiment of the present invention.

FIG. 13 is a block diagram illustrating an example of a configuration of the control apparatus according to the seventh embodiment of the present invention.

FIG. 14 is a block diagram illustrating an example of a configuration of the control apparatus according to the eighth embodiment of the present invention.

DESCRIPTION OF EMBODIMENTS

Figure 2:
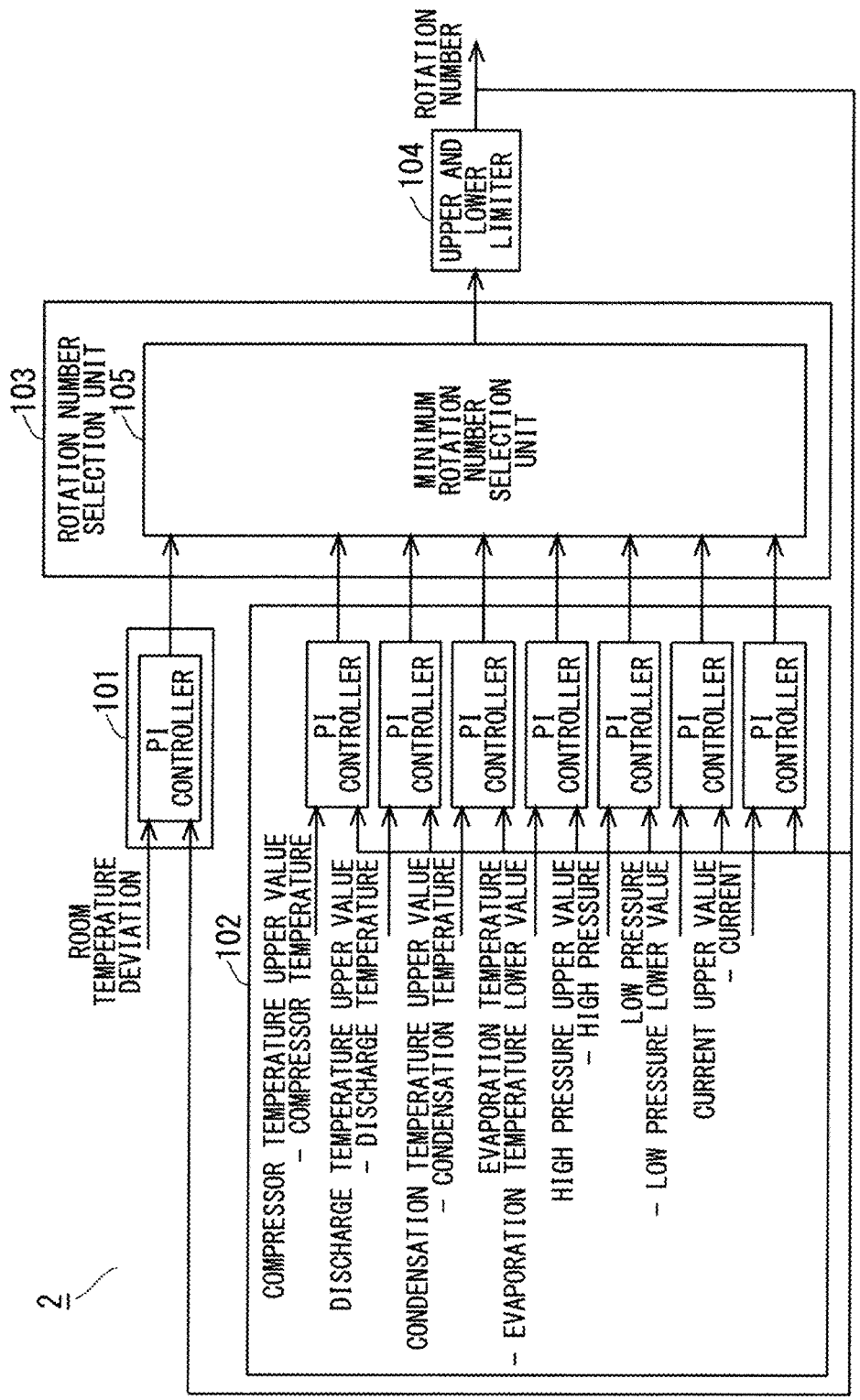
FIG. 2 is a block diagram illustrating an example of a configuration of a control apparatus according to the first embodiment of the present invention.

Embodiments of the present invention will be described below with reference to the drawings.

First Embodiment

<Configuration>

FIG. 1 is a schematic diagram illustrating an example of a configuration of an air conditioning apparatus 1 according to the first embodiment of the present invention.

As illustrated in FIG. 1, the air conditioning apparatus 1 being a refrigeration cycle apparatus includes a control apparatus 2, a compressor 3, a four-way valve 4, an outdoor heat exchanger 5, an electric expansion valve 6, and an indoor heat exchanger 7. The compressor 3, the four-way valve 4, the outdoor heat exchanger 5, the electric expansion valve 6, and the indoor heat exchanger 7 are connected with piping, and refrigerant flows inside the piping.

The air conditioning apparatus 1 includes, as necessary, a compressor temperature sensor 10, a discharge temperature sensor 11, an outdoor heat exchanger temperature sensor 12, an indoor heat exchanger temperature sensor 13, a room temperature sensor 14, a high pressure sensor 15, a low pressure sensor 16, and a current sensor 17.

The control apparatus 2 controls the rotation number of the compressor 3, based on various pieces of sensor information or external input. Here, the rotation number of the compressor 3 is similar in meaning to the speed of an inverter motor constituting the compressor 3.

Note that an accumulator may be connected to a suction side of the compressor 3. Further, a receiver may be connected between the outdoor heat exchanger 5 and the electric expansion valve 6, and another electric thermal expansion valve that is different from the electric expansion valve 6 may be connected between the receiver and the outdoor heat exchanger 5.

A cooling cycle of the air conditioning apparatus 1 will be described. The refrigerant that has been brought into a high temperature and high pressure state through compression of the compressor 3 is discharged from the compressor 3. Subsequently, the refrigerant passes through the piping indicated by the solid line of the four-way valve 4, has its heat dissipated to an outdoor space with the outdoor heat exchanger 5, and liquefies under high pressure. The refrigerant that has passed through the outdoor heat exchanger 5 has its pressure reduced by the electric expansion valve 6 to be brought into a low-temperature two-phase state, absorbs heat from an indoor space with the indoor heat exchanger 7, and vaporizes under low pressure. The refrigerant that has vaporized in the indoor heat exchanger 7 is sucked into the compressor 3 and is compressed. Through the repetition of such an operation as described above, the refrigeration cycle of the air conditioning apparatus 1 is implemented.

A heating cycle of the air conditioning apparatus 1 will be described. The refrigerant in the high temperature and high pressure state that is discharged from the compressor 3 passes through the piping indicated by the broken line of the four-way valve 4, has its heat dissipated to an indoor space with the indoor heat exchanger 7, and liquefies under high temperature. The refrigerant that has liquefied in the indoor heat exchanger 7 has its pressure reduced by the electric expansion valve 6 to be brought into a low-temperature two-phase state, absorbs heat from an outdoor space with the outdoor heat exchanger 5, and vaporizes. The refrigerant that has vaporized in the outdoor heat exchanger 5 is sucked into the compressor 3 and is compressed. Through the repetition of such an operation as described above, the heating cycle of the air conditioning apparatus 1 is implemented.

FIG. 2 is a block diagram illustrating an example of a configuration of the control apparatus 2.

As illustrated in FIG. 2, the control apparatus 2 includes a capacity controller 101, a protection controller 102, a rotation number selection unit 103, and an upper and lower limiter 104.

The capacity controller 101 includes a PI controller being a dynamic controller including an integrator. The capacity controller 101 defines room temperature acquired from the room temperature sensor 14 as a current capacity value indicating the current capacity and set room temperature determined at suitable time as a capacity target value, and calculates a capacity rotation number that is a rotation number command of the compressor 3 necessary for causing the room temperature to asymptotically approach or match the set room temperature.

The protection controller 102 calculates a protection rotation number being a rotation number command of the compressor 3 necessary for causing protection variables being predetermined variables necessary for protecting devices constituting the air conditioning apparatus 1 to asymptotically approach or match their protection target values that are determined at suitable time or in advance. Here, the predetermined variables are compressor temperature, discharge temperature, condensation temperature, evaporation temperature, high pressure, low pressure, and current. The compressor temperature is temperature detected by the compressor temperature sensor 10. The discharge temperature is temperature detected by the discharge temperature sensor 11. The condensation temperature is temperature detected by the outdoor heat exchanger temperature sensor 12 in a case of the cooling cycle, and temperature detected by the indoor heat exchanger temperature sensor 13 in a case of the heating cycle. The evaporation temperature is temperature detected by the indoor heat exchanger temperature sensor 13 in a case of the cooling cycle, and temperature detected by the outdoor heat exchanger temperature sensor 12 in a case of the heating cycle. The high pressure is pressure detected by the high pressure sensor 15. The low pressure is pressure detected by the low pressure sensor 16. The current is current detected by the current sensor 17. Further, the protection target values are a compressor temperature upper value, a discharge temperature upper value, a condensation temperature upper value, an evaporation temperature lower value, a high pressure upper value, a low pressure lower value, and a current upper value.

The protection controller 102 includes a PI controller for each protection variable described above, and calculates the protection rotation number for each protection variable.

Note that the protection variables described above merely illustrate examples of typical variables necessary for protecting the devices, and variables other than those described above may be adopted as the protection variables. Note that the protection variable to be adopted has the following characteristics: for the protection variable whose protection target value increases when the rotation number of the compressor 3 increases, an upper value of the protection variable is used, whereas for the protection variable whose protection target value reduces when the rotation number of the compressor 3 increases, a lower value of the protection variable is used.

The rotation number selection unit 103 includes a minimum rotation number selection unit 105. The minimum rotation number selection unit 105 selects the minimum rotation number out of the capacity rotation number output from the capacity controller 101 and the protection rotation numbers output from the protection controller 102 as a control rotation number.

All of the protection variables illustrated in FIG. 2 have characteristics of changing so as to depart from respective limitations when the rotation number of the compressor 3 increases. For example, when the rotation number of the compressor 3 is increased, the discharge temperature increases and changes so as to exceed the discharge temperature upper value. Thus, when the minimum rotation number selection unit 105 selects the minimum rotation number out of the capacity rotation number output from the capacity controller 101 and the protection rotation numbers output from the protection controller 102, all of the protection variables can be controlled within their upper and lower limits.

The upper and lower limiter 104 stores a predetermined rotation number upper value Rmax and rotation number lower value Rmin. When the control rotation number selected by the rotation number selection unit 103 is the rotation number lower value Rmin or lower, the upper and lower limiter 104 outputs the rotation number lower value Rmin, when the control rotation number is the rotation number upper value Rmax or higher, the upper and lower limiter 104 outputs the rotation number upper value Rmax, and in other cases, the upper and lower limiter 104 outputs the control rotation number as it is. The compressor 3 operates according to the rotation number output from the upper and lower limiter 104. The rotation number output from the upper and lower limiter 104 is fed back to the capacity controller 101 and the protection controller 102, and is used for calculation in a reset function of integrated values.

<Reset Function of Integrated Value>

FIG. 3 is a block diagram illustrating an example of a configuration of a PI controller 111 being a controller that performs proportional (P)-integral (I) control. Note that the PI controller 111 corresponds to the PI controller included in each of the capacity controller 101 and the protection controller 102 illustrated in FIG. 2.

The PI controller 111 includes two inputs and one output. Parameters are a proportional gain 112 (Kp), an integral gain 113 (Ki), and a constant 114 (Ka).

First, a value a is calculated, which is obtained by multiplying, by a constant 114, a value obtained by subtracting input 2 defined as the rotation number of the compressor 3 from output being output of the PI controller 111. Note that although the constant 114 is a set parameter, a reciprocal of the proportional gain 112 is often used in PI control.

Next, a value ε is calculated, which is obtained by subtracting a from input 1 being deviation information. Finally, a value obtained by adding a value obtained by multiplying input 1 by the proportional gain 112 and a value obtained by multiplying an integrated value of ε by the integral gain 113 and a control period Ts is output as output.

To put the above description in an expression, the following expression (1) is obtained, where k represents the number of steps in repeated calculation.

[Expression 1]

$$\begin{aligned} &t(k-1) - \text{input2}(k)) \\ &\text{it1}(k) - a(k) \\ &1(k) + Ki \times Ts \times \sum_{l=0}^{k} \varepsilon(l) \end{aligned} \quad (1)$$

According to the method described above, integrated values stored in an integrator 115 are not diverged. The reset function of the integrated values is continuous processing, and when the control period Ts becomes smaller, it approaches behavior of a continuous system.

<Operation>

Figure 4:
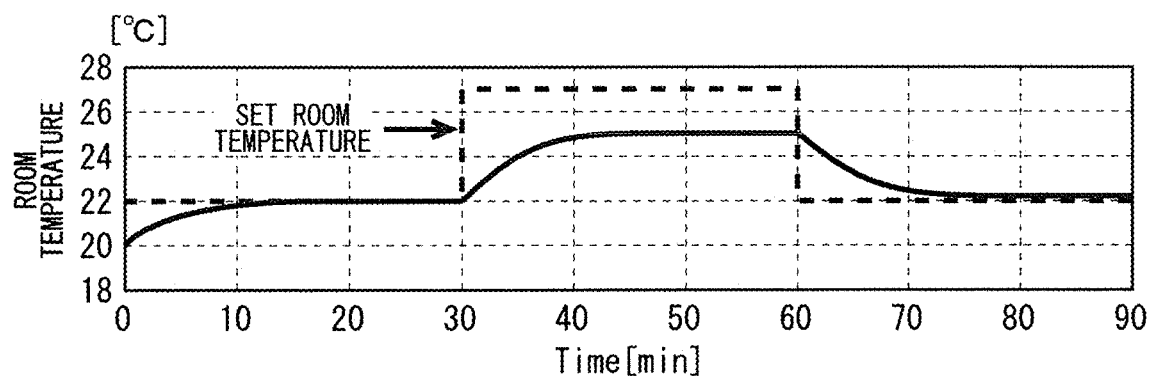
FIG. 4 is a diagram for illustrating operation of the air conditioning apparatus according to the first embodiment of the present invention.
Figure 5:
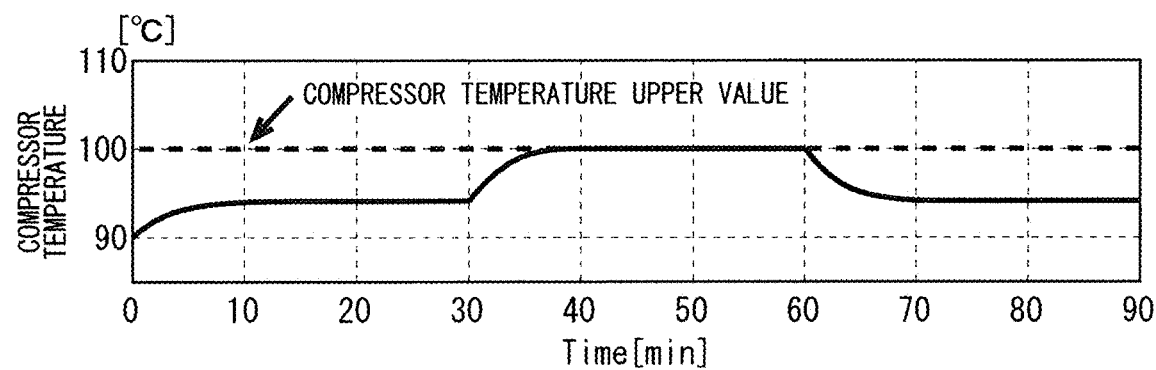
FIG. 5 is a diagram for illustrating operation of the air conditioning apparatus according to the first embodiment of the present invention.

FIGS. 4 to 6 are each a diagram for illustrating operation of the air conditioning apparatus 1. Here, as an example, heating operation including the compressor temperature as the protection variable will be described.

As illustrated in FIG. 4, the set room temperature being the capacity target value is set to be 22° C. from 0 min to 30 min, 27° C. from 30 min to 60 min, and 22° C. from 60 min to 90 min. Note that the solid line in FIG. 4 denotes the room temperature.

As illustrated in FIG. 5, the compressor temperature upper value being the protection target value for the compressor temperature is set to be 100° C. Note that, in FIG. 5, the solid line denotes the compressor temperature.

As illustrated in FIG. 6, the capacity rotation number is below the protection rotation number from 0 min to 30 min, and the rotation number selection unit 103 selects the capacity rotation number. As a result, the room temperature asymptotically approaches the set room temperature, the compressor temperature becomes smaller than the compressor temperature upper value, and the air conditioning apparatus 1 operates within limitations. Further, owing to the reset function of the integrated value, the protection rotation number avoids divergence without continuing to increase, in spite of the fact that a difference between the compressor temperature and the compressor temperature upper value is not zero.

When the set room temperature is changed to 27° C. at the time point of 30 min, the protection rotation number falls below the capacity rotation number, and thus the rotation number selection unit 103 selects the protection rotation number. As a result, the compressor temperature asymptotically approaches the compressor temperature upper value, the room temperature becomes smaller than the set room temperature, and the air conditioning apparatus 1 operates within limitations. Further, owing to the reset function of the integrated value, the protection rotation number and the capacity rotation number are not significantly deviated, and thus when an operation condition of the air conditioning apparatus 1 changes, the control rotation number is instantaneously switched, and high-accuracy control of the rotation number of the compressor 3 can be implemented.

Note that, in a time period when the compressor temperature asymptotically approaches the compressor temperature upper value, the room temperature does not reach the set room temperature and the capacity is smaller than requested. However, if the rotation number is increased in order to further increase the capacity, the compressor temperature undesirably exceeds the compressor temperature upper value. Thus, the operation state in which the compressor temperature asymptotically approaches the compressor temperature upper value is the operation state in which performance of the devices constituting the air conditioning apparatus 1 is continuously exerted at the maximum and the capacity of the air conditioning apparatus 1 is maximized.

When the set room temperature is changed to 22° C. again at the time point of 60 min, the capacity rotation number immediately falls below the protection rotation number, and the rotation number selection unit 103 selects the capacity rotation number. As a result, the room temperature asymptotically approaches the set room temperature, the compressor temperature becomes smaller than the compressor temperature upper value, and the air conditioning apparatus 1 operates within limitations.

<Modification>

The above has described a case in which seven protection variables are defined. However, this is not restrictive, and the protection variable(s) may be selected according to the devices constituting the air conditioning apparatus 1 and the operation condition of the air conditioning apparatus 1. For example, only the compressor temperature may be used as the protection variable, or two variables, namely the compressor temperature and the discharge temperature, may be used as the protection variables. When the protection variables are limited, sensors corresponding to the variables not to be limited may be excluded from the configuration of the air conditioning apparatus 1.

The air conditioning apparatus 1 need not include pressure sensors such as the high pressure sensor 15 and the low pressure sensor 16. In this case, high pressure calculated based on the condensation temperature and low pressure calculated based on the evaporation temperature may be adopted as the protection variables. When the high pressure is calculated, the condensation temperature upper value may not be adopted as the protection variable. When the low pressure is calculated, the evaporation temperature lower value may not be adopted as the protection variable.

The capacity controller 101 and the protection controller 102 are not limited to the PI controllers, and are only required to include a dynamic controller including at least an integrator, and for example, a proportional-integral-differential (PID) controller, an integral (I) controller, or the like may be used.

The above has described a position-type PI controller, but a speed-type PI controller may be used.

The modification of the first embodiment described above can also be similarly applied to other embodiments to be described later.

<Effects>

According to the first embodiment, influences such as changes in an ambient environment, variation of performance of the devices constituting the refrigeration cycle apparatus, and aging of the refrigeration cycle apparatus can be reduced, and any one of the room temperature, the compressor temperature, the discharge temperature, the condensation temperature, the evaporation temperature, the high pressure, the low pressure, and the current can be caused to asymptotically approach a target value. For example, when the room temperature asymptotically approaches a target value, the compressor temperature is the compressor temperature upper value or lower, the discharge temperature is the discharge temperature upper value or lower, the condensation temperature is the condensation temperature upper value or lower, the evaporation temperature is the evaporation temperature lower value or higher, the high pressure is the high pressure upper value or lower, and the low pressure is the low pressure lower value or higher. Specifically, it is guaranteed regarding the air conditioning apparatus 1 that all of the protection variables operate within limitations. When one of the protection variables asymptotically approaches the protection target value, it is guaranteed that all of the other protection variables are within limitations.

When the protection variable asymptotically approaches the protection target value, although the room temperature does not necessarily asymptotically approach the set room temperature, the compressor 3 operates at the largest rotation number within limitations. Thus, the capacity of the air conditioning apparatus 1 is maximized, and deviation between the room temperature and the set room temperature is minimized. Specifically, nearly maximum performance of the devices constituting the air conditioning apparatus 1 can be exerted. In a situation in which the protection variables change due to the reset function of the integrated value, the control rotation number selected by the rotation number selection unit 103 is switched automatically, immediately, and smoothly, and an air conditioning system that enables continuous protection of the devices constituting the air conditioning apparatus 1 can be implemented.

The capacity target value and the protection target value may be set from the outside as variable values. For example, for the sake of energy saving, an upper system that changes the set room temperature at predetermined time may be used in cooperation, and the set room temperature output from the upper system may be defined as the capacity target value. Further, for example, when the upper system makes a request of limiting the current to a determined value or less at suitable time (as appropriate, at predetermined appropriate time), by defining a current value corresponding to the request as the protection target value, operation of the air conditioning apparatus 1 in compliance with electricity regulations or the like can be implemented. Alternatively, if a system incorporating a wattmeter is used, an air conditioning system that can comply with the request of limiting power from the upper system to a predetermined value or less can be implemented.

Second Embodiment

Figure 7:
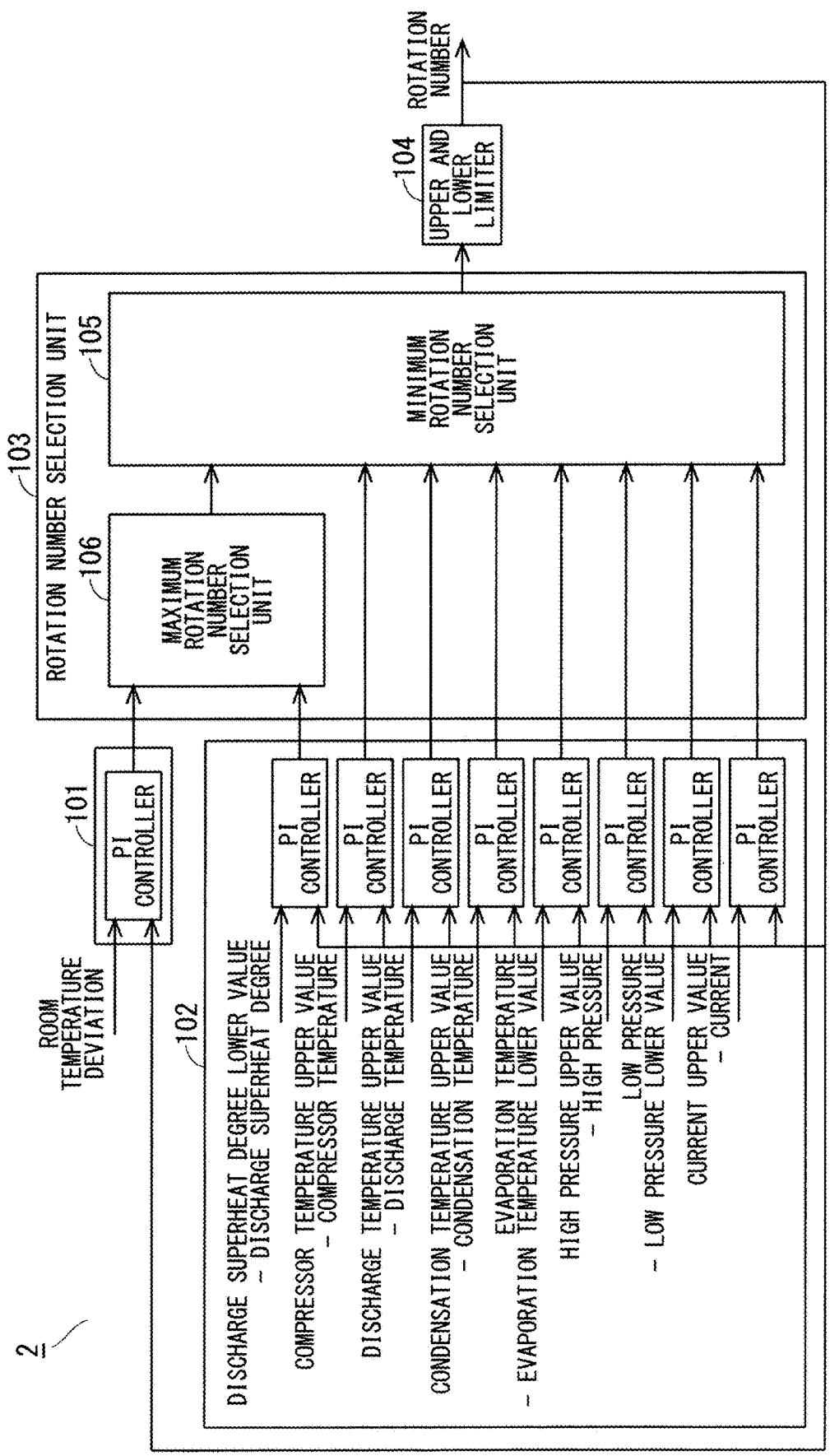
FIG. 7 is a block diagram illustrating an example of a configuration of the control apparatus according to the second embodiment of the present invention.

FIG. 7 is a block diagram illustrating an example of a configuration of the control apparatus 2 according to the second embodiment.

As illustrated in FIG. 7, in the control apparatus 2 according to the second embodiment, the protection controller 102 includes a PI controller corresponding to a discharge superheat degree, and the rotation number selection unit 103 includes a maximum rotation number selection unit 106. Other configurations and operations are similar to those of the first embodiment, and thus detailed description thereof is herein omitted.

As illustrated in FIG. 7, in the second embodiment, the discharge superheat degree is included as the protection variable, and a discharge superheat degree lower value is included as the protection target value. Note that, although the compressor temperature, the discharge temperature, the condensation temperature, the evaporation temperature, the high pressure, the low pressure, and the current included in the protection variables described in the first embodiment depart from limitations when the rotation number of the compressor 3 is increased, the discharge superheat degree departs from limitations when the rotation number of the compressor 3 is reduced. For example, when the rotation number of the compressor 3 is increased, the discharge temperature increases and changes so as to exceed the discharge temperature upper value, whereas when the rotation number of the compressor 3 is reduced, the discharge superheat degree reduces and changes so as to fall below the discharge superheat degree lower value. Thus, it is desirable that the rotation number of the compressor 3 be larger than the protection rotation number calculated by the PI controller corresponding to the discharge superheat degree.

The rotation number selection unit 103 according to the second embodiment includes a maximum rotation number selection unit 106 and a minimum rotation number selection unit 105. The maximum rotation number selection unit 106 compares the capacity rotation number calculated by the capacity controller 101 and the protection rotation number calculated by the PI controller corresponding to the discharge superheat degree, and outputs the larger rotation number as a selected rotation number. The minimum rotation number selection unit 105 compares the selected rotation number output from the maximum rotation number selection unit 106 and the protection rotation number calculated by the PI controllers corresponding to the protection variables other than the discharge superheat degree, and selects the minimum rotation number as the control rotation number.

Based on the above, according to the second embodiment, the compressor 3 is controlled at the rotation number for causing the discharge superheat degree to asymptotically approach the discharge superheat degree lower value or a higher rotation number. Accordingly, liquid refrigerant can be arranged not to flow into the compressor 3, and a long life of the devices constituting the air conditioning apparatus 1 can be implemented.

Note that the above has described a case in which the discharge superheat degree is adopted as the protection variable. However, variables other than the discharge superheat degree may be adopted as the protection variables.

A plurality of protection rotation numbers may be input to the maximum rotation number selection unit 106. Note that the protection variable corresponding to the protection rotation numbers input to the maximum rotation number selection unit 106 has the following characteristics: for the protection variable whose protection target value increases when the rotation number of the compressor 3 increases, a lower value of the protection variable is used, whereas for the protection variable whose protection target value reduces when the rotation number of the compressor 3 increases, an upper value of the protection variable is used.

In a temperature condition in a case of operation of the air conditioning apparatus 1 or in a transitional state of actual operation of the air conditioning apparatus 1, the protection rotation number corresponding to the discharge superheat degree may be larger than the protection rotation numbers corresponding to the protection variables other than the discharge superheat degree. In the limitations of the discharge superheat degree, occurrence of a problem immediately after the departure is relatively infrequent. Thus, in such a case, other protection variables need to be preferentially put within limitations by setting the discharge superheat degree to the discharge superheat degree lower value or lower. In order to implement the operation as described above, in the rotation number selection unit 103, arithmetic of the minimum rotation number selection unit 105 is performed after arithmetic of the maximum rotation number selection unit 106. By adopting the configuration as described above, an air conditioning system in which the order of priority is provided for the protection variables can be implemented.

Third Embodiment

Figure 8:
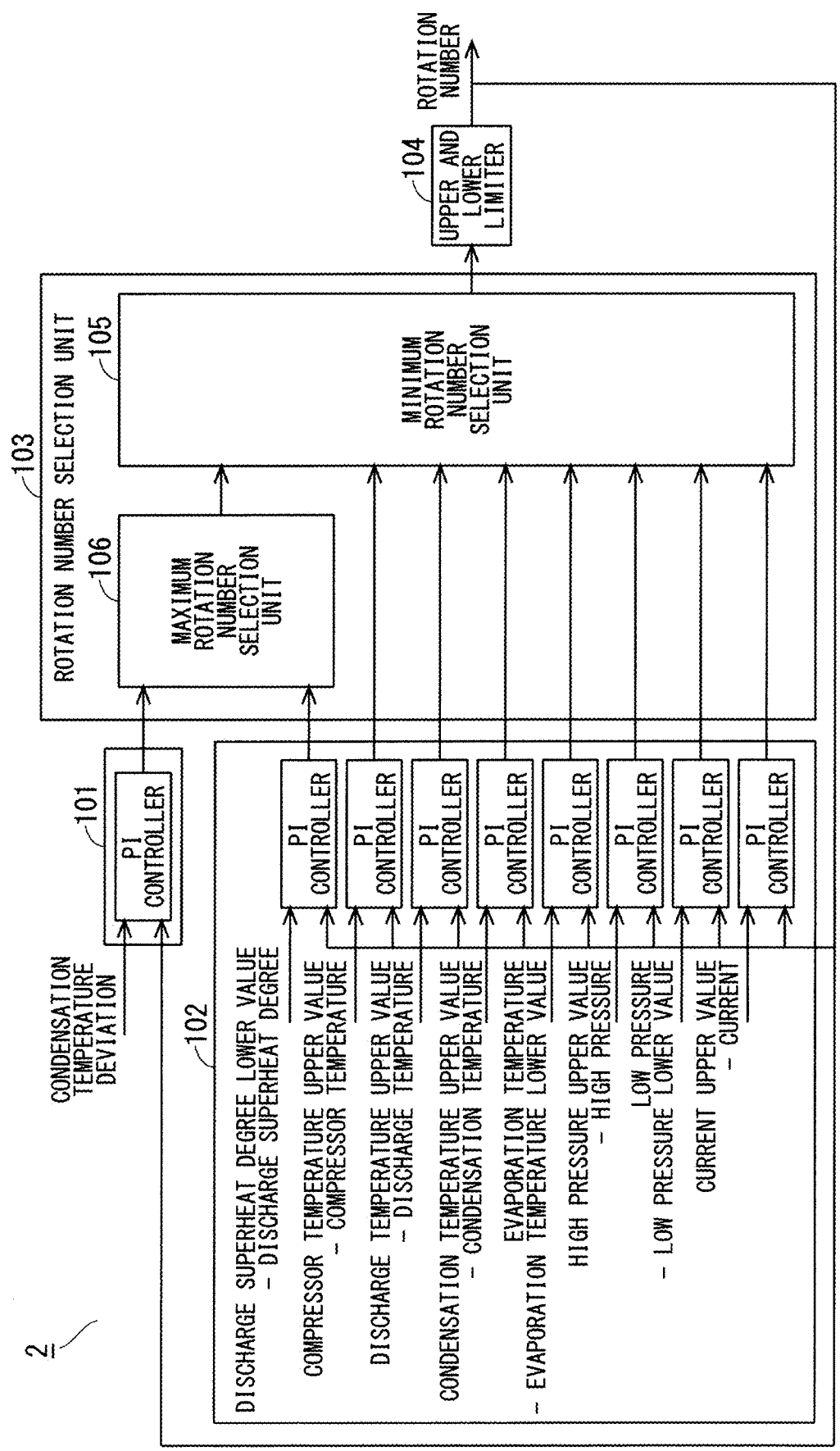
FIG. 8 is a block diagram illustrating an example of a configuration of the control apparatus according to the third embodiment of the present invention.

FIG. 8 is a block diagram illustrating an example of a configuration of the control apparatus 2 according to the third embodiment.

As illustrated in FIG. 8, in a case of heating operation, the control apparatus 2 according to the third embodiment defines the condensation temperature as the current capacity value, defines a condensation temperature target value as the capacity target value, and calculates the rotation number of the compressor 3 for causing the condensation temperature to asymptotically approach the condensation temperature target value. Other configurations and operations are similar to those of the second embodiment, and thus detailed description thereof is herein omitted.

As the condensation temperature, temperature detected by the indoor heat exchanger temperature sensor 13 may be used. Further, as the condensation temperature, temperature obtained through conversion using a calculation expression for obtaining saturation temperature based on pressure detected by the high pressure sensor 15 may be used.

As the condensation temperature target value, a predetermined constant may be used. Further, the condensation temperature target value is a value that is successively calculated based on the room temperature and the set room temperature, and a variable having such characteristics as to have a larger value when the room temperature is lower than the set room temperature and have a smaller value when the room temperature is higher than the set room temperature may be used. Alternatively, for the sake of energy saving, an upper system that changes the condensation temperature target value at each time is used in cooperation, and the condensation temperature target value output from the upper system may be defined as the capacity target value.

Based on the above, according to the third embodiment, influences received due to disturbance for a detected value of the room temperature can be reduced, and an air conditioning system having small abrupt changes can be implemented. Further, by adopting a configuration of not using room temperature information for the condensation temperature target value, the capacity of the air conditioning apparatus 1 can be controlled even without the room temperature sensor 14. In addition, by adopting a configuration of obtaining the condensation temperature based on the pressure detected by the high pressure sensor 15, the air conditioning apparatus 1 can be controlled with information of only and outdoor unit even without information of an indoor unit. Thus, an air conditioning system in which the outdoor unit can be independently controlled without receiving influences of limitations such as communication can be implemented.

Fourth Embodiment

Figure 9:
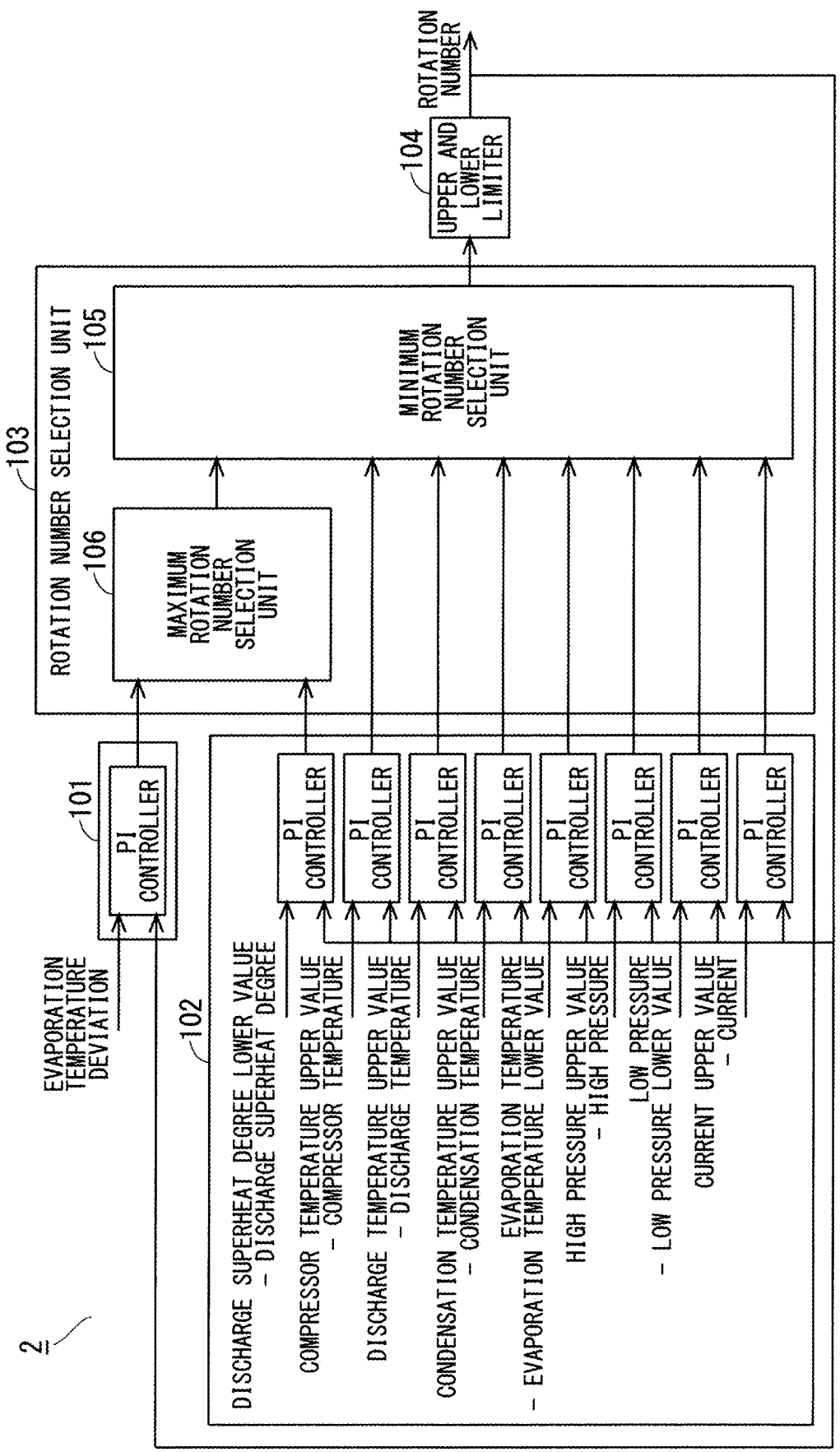
FIG. 9 is a block diagram illustrating an example of a configuration of the control apparatus according to the fourth embodiment of the present invention.

FIG. 9 is a block diagram illustrating an example of a configuration of the control apparatus 2 according to the fourth embodiment.

As illustrated in FIG. 9, in a case of cooling operation, the control apparatus 2 according to the fourth embodiment defines the evaporation temperature as the current capacity value, defines an evaporation temperature target value as the capacity target value, and calculates the rotation number of the compressor 3 for causing the evaporation temperature to asymptotically approach the evaporation temperature target value. Other configurations and operations are similar to those of the second embodiment, and thus detailed description thereof is herein omitted.

As the evaporation temperature, temperature detected by the indoor heat exchanger temperature sensor 13 may be used. Further, as the evaporation temperature, temperature obtained through conversion using a calculation expression for obtaining saturation temperature based on pressure detected by the low pressure sensor 16 may be used.

As the evaporation temperature target value, a predetermined constant may be used. Further, the evaporation temperature target value is a value that is successively calculated based on the room temperature and the set room temperature, and a variable having such characteristics as to have a larger value when the room temperature is lower than the set room temperature and have a smaller value when the room temperature is higher than the set room temperature may be used. Alternatively, for the sake of energy saving, an upper system that changes the evaporation temperature target value at each time is used in cooperation, and the evaporation temperature target value output from the upper system may be defined as the capacity target value.

Based on the above, according to the fourth embodiment, influences received due to disturbance for a detected value of the room temperature can be reduced, and an air conditioning system having small abrupt changes can be implemented. Further, by adopting a configuration of not using room temperature information for the evaporation temperature target value, the capacity of the air conditioning apparatus 1 can be controlled even without the room temperature sensor 14. In addition, by adopting a configuration of obtaining the evaporation temperature based on the pressure detected by the low pressure sensor 16, the air conditioning apparatus 1 can be controlled with information of only and outdoor unit even without information of an indoor unit. Thus, an air conditioning system in which the outdoor unit can be independently controlled without receiving influences of limitations such as communication can be implemented.

Fifth Embodiment

Figure 10:
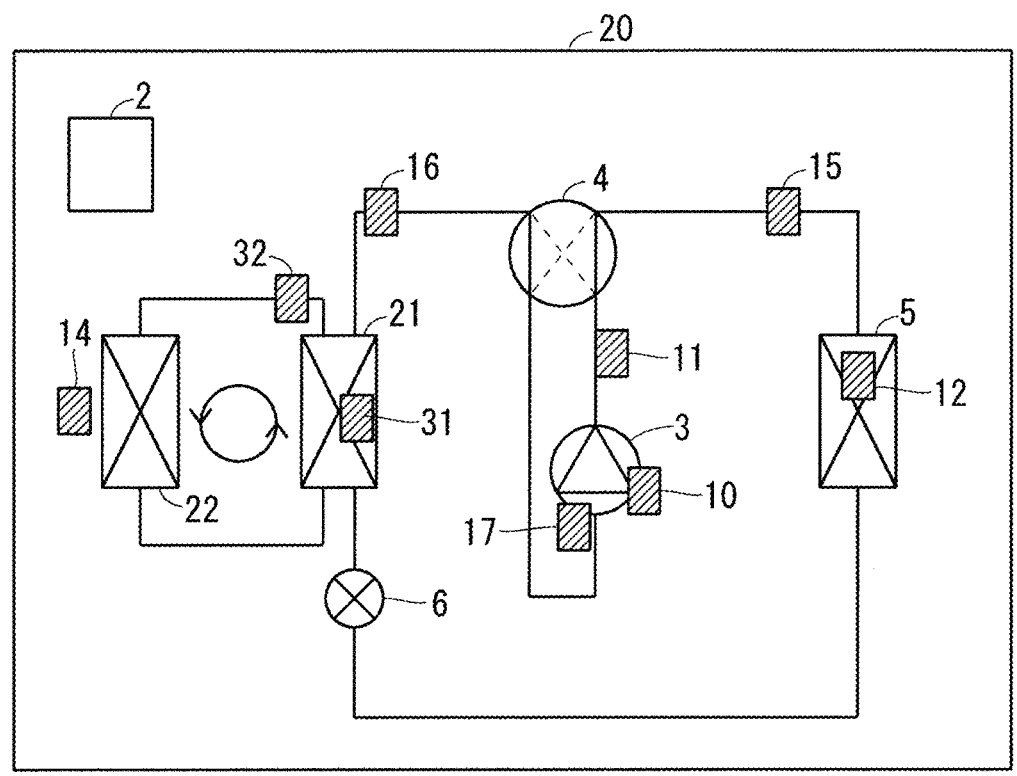
FIG. 10 is a schematic diagram illustrating an example of a configuration of the air conditioning apparatus according to the fifth embodiment of the present invention.

FIG. 10 is a schematic diagram illustrating an example of a configuration of an air conditioning apparatus 20 according to the fifth embodiment of the present invention.

As illustrated in FIG. 10, the air conditioning apparatus 20 is a water air conditioning system. Specifically, the air conditioning apparatus 20 includes a water refrigerant heat exchanger 21 and a water-type indoor heat exchanger 22. Other configurations and operations are similar to those of the air conditioning apparatus 1 according to the second embodiment, and thus detailed description thereof is herein omitted.

The water refrigerant heat exchanger 21 and the water-type indoor heat exchanger 22 are connected with piping, and water flows inside the piping. The water refrigerant heat exchanger 21 performs heat exchange between refrigerant and water, and the water that has been subjected to heat exchange circulates in the piping. Further, at an outlet of the water refrigerant heat exchanger 21, an outlet water temperature sensor 32 is provided. The outlet water temperature sensor 32 measures outlet water temperature of the water refrigerant heat exchanger 21. In addition, a water refrigerant heat exchanger temperature sensor 31 is provided in the water refrigerant heat exchanger 21. The water refrigerant heat exchanger temperature sensor 31 measures temperature of the water refrigerant heat exchanger 21.

Figure 11:
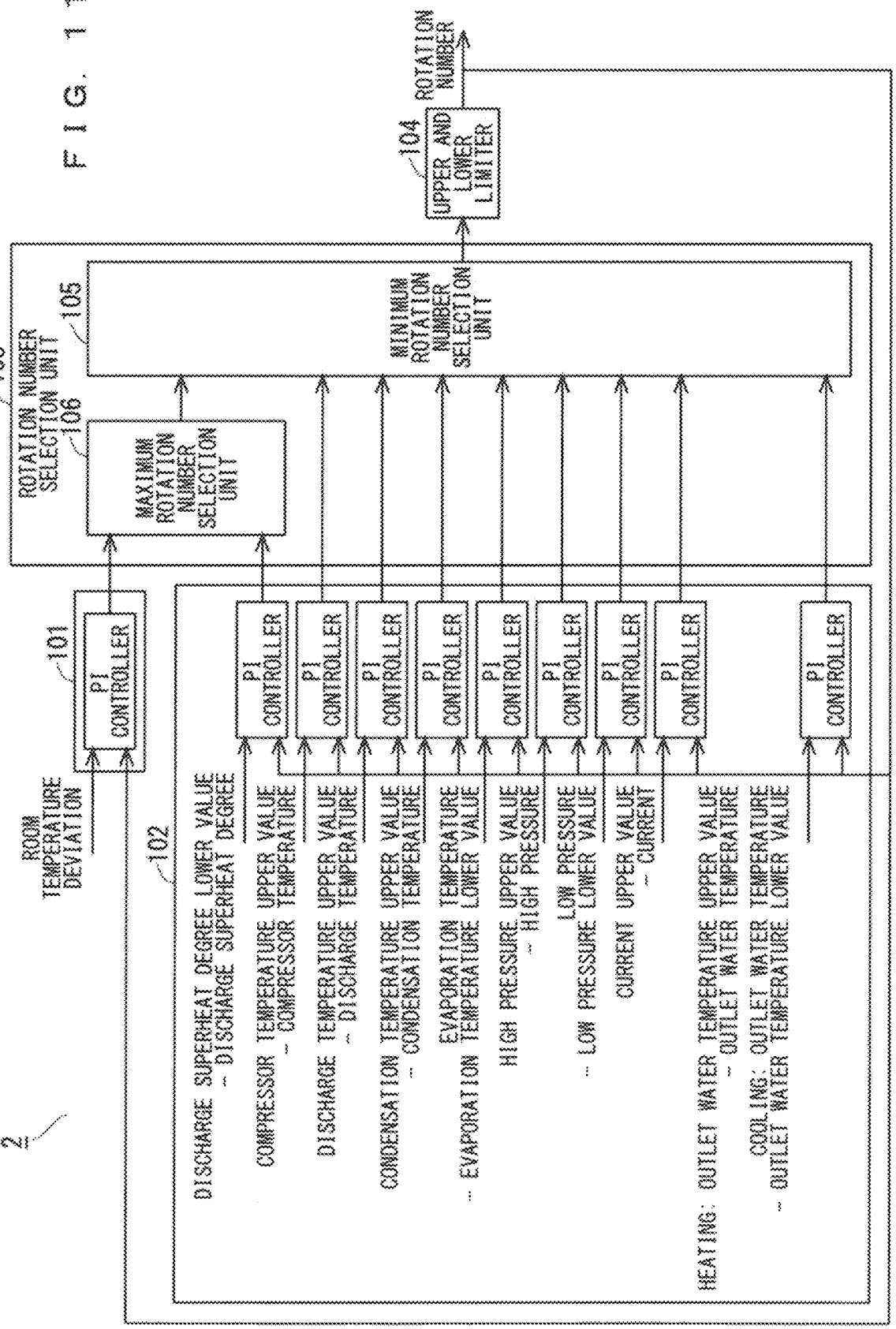
FIG. 11 is a block diagram illustrating an example of a configuration of the control apparatus according to the fifth embodiment of the present invention.

FIG. 11 is a block diagram illustrating an example of a configuration of the control apparatus 2 included in the air conditioning apparatus 20.

As illustrated in FIG. 11, in the fifth embodiment, the outlet water temperature is included as the protection variable, an outlet water temperature upper value is included as the protection target value in a case of heating, and an outlet water temperature lower value is included as the protection target value in a case of cooling.

Based on the above, according to the fifth embodiment, in a situation in which the outlet water temperature is required to be protected, the outlet water temperature is included as the protection variable, the outlet water temperature upper value is included as the protection target value in a case of heating, and the outlet water temperature lower value is included as the protection target value in a case of cooling. Then, in a case of heating, the rotation number of the compressor 3 is controlled so that the outlet water temperature asymptotically approaches the outlet water temperature upper value, and in a case of cooling, the compressor 3 is controlled at the rotation number for causing the outlet water temperature to asymptotically approach the outlet water temperature lower value or a lower rotation number. Accordingly, the outlet water temperature can be arranged not to become excessively high temperature in a case of heating, and freezing of water in a case of cooling can be arranged not to occur.

Further, some water air conditioning systems make a stop request to the compressor 3 when the outlet water temperature departs from a permitted range. For such the system as described above, by setting the protection target value corresponding to the outlet water temperature to be within permitted limitations, unnecessary stop requests for the compressor 3 can be arranged not to be made, and high-efficiency operation of the water air conditioning system can be implemented.

Sixth Embodiment

FIG. 12 is a block diagram illustrating an example of a configuration of the control apparatus 2 according to the sixth embodiment.

As illustrated in FIG. 12, in a case of heating operation, the control apparatus 2 according to the sixth embodiment defines the condensation temperature as the current capacity value, defines a condensation temperature target value as the capacity target value, and calculates the rotation number of the compressor 3 for causing the condensation temperature to asymptotically approach the condensation temperature target value. Other configurations and operations are similar to those of the fifth embodiment, and thus detailed description thereof is herein omitted.

As the condensation temperature, temperature detected by the water refrigerant heat exchanger temperature sensor 31 may be used. Further, as the condensation temperature, temperature obtained through conversion using a calculation expression for obtaining saturation temperature based on pressure detected by the high pressure sensor 15 may be used.

As the condensation temperature target value, a predetermined constant may be used. Further, the condensation temperature target value is a value that is successively calculated based on the room temperature and the set room temperature, and a variable having such characteristics as to have a larger value when the room temperature is lower than the set room temperature and have a smaller value when the room temperature is higher than the set room temperature may be used. Alternatively, for the sake of energy saving, an upper system that changes the condensation temperature target value at each time is used in cooperation, and the condensation temperature target value output from the upper system may be defined as the capacity target value.

Based on the above, according to the sixth embodiment, influences received due to disturbance for a detected value of the room temperature can be reduced, and a water air conditioning system having small abrupt changes can be implemented. Further, by adopting a configuration of not using room temperature information for the condensation temperature target value, the capacity of the air conditioning apparatus 1 can be controlled even without the room temperature sensor 14. In addition, by adopting a configuration of obtaining the condensation temperature based on the pressure detected by the high pressure sensor 15, the air conditioning apparatus 20 can be controlled with information of only and outdoor unit even without information of an indoor unit. Thus, a water air conditioning system in which the outdoor unit can be independently controlled without receiving influences of limitations such as communication can be implemented.

Seventh Embodiment

FIG. 13 is a block diagram illustrating an example of a configuration of the control apparatus 2 according to the seventh embodiment.

As illustrated in FIG. 13, in a case of cooling operation, the control apparatus 2 according to the seventh embodiment defines the evaporation temperature as the current capacity value, defines an evaporation temperature target value as the capacity target value, and calculates the rotation number of the compressor 3 for causing the evaporation temperature to asymptotically approach the evaporation temperature target value. Other configurations and operations are similar to those of the fifth embodiment, and thus detailed description thereof is herein omitted.

As the evaporation temperature, temperature detected by the water refrigerant heat exchanger temperature sensor 31 may be used. Further, as the evaporation temperature, temperature obtained through conversion using a calculation expression for obtaining saturation temperature based on pressure detected by the low pressure sensor 16 may be used.

As the evaporation temperature target value, a predetermined constant may be used. Further, the evaporation temperature target value is a value that is successively calculated based on the room temperature and the set room temperature, and a variable having such characteristics as to have a larger value when the room temperature is lower than the set room temperature and have a smaller value when the room temperature is higher than the set room temperature may be used. Alternatively, for the sake of energy saving, an upper system that changes the evaporation temperature target value at each time is used in cooperation, and the evaporation temperature target value output from the upper system may be defined as the capacity target value.

Based on the above, according to the seventh embodiment, influences received due to disturbance for a detected value of the room temperature can be reduced, and a water air conditioning system having small abrupt changes can be implemented. Further, by adopting a configuration of not using room temperature information for the evaporation temperature target value, the capacity of the air conditioning apparatus 1 can be controlled even without the room temperature sensor 14. In addition, by adopting a configuration of obtaining the evaporation temperature based on the pressure detected by the low pressure sensor 16, the air conditioning apparatus 20 can be controlled with information of only and outdoor unit even without information of an indoor unit. Thus, a water air conditioning system in which the outdoor unit can be independently controlled without receiving influences of limitations such as communication can be implemented.

Eighth Embodiment

FIG. 14 is a block diagram illustrating an example of a configuration of the control apparatus 2 according to the eighth embodiment.

As illustrated in FIG. 14, the control apparatus 2 according to the eighth embodiment defines the outlet water temperature as the current capacity value, defines an outlet water temperature target value as the capacity target value, and calculates the rotation number of the compressor 3 for causing the outlet water temperature to asymptotically approach the outlet water temperature target value. Other configurations and operations are similar to those of the fifth embodiment, and thus detailed description thereof is herein omitted.

As the outlet water temperature, temperature detected by the outlet water temperature sensor 32 may be used.

As the outlet water temperature target value, a predetermined constant may be used. The constant may be set by a user. Further, the outlet water temperature target value is a value that is successively calculated based on the room temperature and the set room temperature, and a variable having such characteristics as to have a larger value when the room temperature is lower than the set room temperature and have a smaller value when the room temperature is higher than the set room temperature may be used. Alternatively, for the sake of energy saving, an upper system that changes the outlet water temperature target value at each time is used in cooperation, and the outlet water temperature target value output from the upper system may be defined as the capacity target value.

Based on the above, according to the eighth embodiment, influences received due to disturbance for a detected value of the room temperature can be reduced, and a water air conditioning system having small abrupt changes can be implemented.

Ninth Embodiment

In the PI controller or the PID controller included in the capacity controller 101 and the protection controller 102 according to the first to eighth embodiments, the reset function of the integrated value may be executed with a method using non-continuous processing. The method is, for example, implemented as in the following expression (2).

[Expression 2]

$$I(k) = \begin{cases} I(k-1) + Ki \times Ts \times \text{input1}(k), & \text{output}(k-1) = \text{input2}(k) \\ \text{input2}(k-1), & \text{otherwise} \end{cases} \quad (2)$$

$$\text{output}(k) = Kp \times \text{input1}(k) + I(k)$$

Here, I is an integrated value stored in the integrator 115. A reset method of the integrated value may be different depending on a controller.

The method of reset of the integrated value using the continuous processing described in the first embodiment is a method that is effective when the control period is sufficiently short. Thus, when the control period is short, the continuous processing may be executed, whereas when the control period is long, the non-continuous processing may be executed. For example, when the control period is shorter than Ti=Kp/Ki (Ti: integral time period), the continuous processing may be executed, whereas when the control period is the integral time period or longer, the non-continuous processing may be executed.

Note that the implementation method of the reset function of the integrated value using the non-continuous processing is not limited to the above. Any implementation method may be used, in so far as output of the controller and output of the upper and lower limiter 104 are compared, and processing different from usual integral operation is executed when the values are different.

Based on the above, according to the ninth embodiment, even when the control periods are different in the controllers, the controllers have an appropriate reset function of the integrated value. As a result, when the protection variables are switched due to change in an operation state of the air conditioning apparatus 1 or 20, the controller that generates the protection rotation number to be input to the rotation number selection unit 103 is immediately switched, and the operation of the air conditioning apparatus 1 or 20 can be continued stably without departing from the limitations.

Note that, in the present invention, each embodiment can be freely combined, and each embodiment can be modified or omitted as appropriate within the scope of the invention.

While the invention has been shown and described in detail, the foregoing description is in all aspects illustrative and not restrictive. It is therefore understood that numerous unillustrated modifications can be devised without departing from the scope of the present invention.

Explanation of Reference Signs

1 Air conditioning apparatus, 2 Control apparatus, 3 Compressor, 4 Four-way valve, 5 Outdoor heat exchanger, 6 Electric expansion valve, 7 Indoor heat exchanger, 10 Compressor temperature sensor, 11 Discharge temperature sensor, 12 Outdoor heat exchanger temperature sensor, 13 Indoor heat exchanger temperature sensor, 14 Room temperature sensor, 15 High pressure sensor, 16 Low pressure sensor, 17 Current sensor, 20 Air conditioning apparatus, 21 Water refrigerant heat exchanger, 22 Water-type indoor heat exchanger, 31 Water refrigerant heat exchanger temperature sensor, 32 Outlet water temperature sensor, 101 Capacity controller, 102 Protection controller, 103 Rotation number selection unit, 104 Upper and lower limiter, 105 Minimum rotation number selection unit, 106 Maximum rotation number selection unit, 111 PI controller, 112 Proportional gain, 113 Integral gain, 114 Constant, 115 Integrator

The invention claimed is:

1. A refrigeration cycle apparatus comprising:
 a compressor whose rotation number is a variable; and
 a control apparatus configured to calculate a rotation number command of the compressor for handling the rotation number of the compressor, the control apparatus including processing circuitry
 to calculate the rotation number of the compressor as a capacity rotation number by using a first controller including at least a first integrator to cause a current capacity value indicating current capacity of the refrigeration cycle apparatus to be a capacity target value,
 to calculate the rotation number of the compressor as a protection rotation number by using a second controller including at least a second integrator to cause a protection variable being a variable related to a limitation item including protection of the refrigeration cycle apparatus to be a protection target value,
 to select any one of the capacity rotation number calculated and the protection rotation number calculated as the rotation number command of the compressor, and
 to apply predetermined upper and lower-limit limitations to the rotation number command, and output a final rotation number command to the compressor, wherein
 the first controller performs reset processing of the first integrator by using a difference between output of the first controller and the final rotation number command, and
 the second controller performs reset processing of the second integrator by using a difference between output of the second controller and the final rotation number command.

2. The refrigeration cycle apparatus according to claim 1, wherein
 the first controller and the second controller are each a PI controller, and
 the reset processing of the first integrator and the reset processing of the second integrator each include comparing an integral time period calculated based on a parameter of PI control and a control period, performing integral reset with a non-continuous method when the control period is the integral time period or longer, and performing integral reset with a continuous method when the control period is less than the integral time period.

3. The refrigeration cycle apparatus according to claim 1, wherein
 the protection variable is at least one of a discharge superheat degree, compressor temperature, discharge temperature, condensation temperature, evaporation temperature, high pressure, low pressure, outlet water temperature, and current.

4. The refrigeration cycle apparatus according to claim 1, wherein
 the current capacity value is any one of room temperature, evaporation temperature, condensation temperature, and outlet water temperature, and
 the capacity target value for the room temperature, the evaporation temperature, the condensation temperature, or the outlet water temperature is set to be a room temperature, an evaporation temperature target value, a condensation temperature target value, or an outlet water temperature target value, respectively.

5. A refrigeration cycle apparatus comprising:
 a compressor whose rotation number is a variable; and
 a control apparatus configured to calculate a rotation number command of the compressor for handling the rotation number of the compressor, the control apparatus including processing circuitry to calculate the rotation number of the compressor as a capacity rotation number to cause a current capacity value indicating current capacity of the refrigeration cycle apparatus to be a capacity target value, to calculate the rotation number of the compressor as a protection rotation number to cause a protection variable being a variable related to a limitation item including protection of the refrigeration cycle apparatus to be a protection target value, and to select any one of the capacity rotation number calculated and the protection rotation number calculated as the rotation number command of the compressor, wherein the rotation number command of the compressor is calculated so that at least any one of causing the current capacity value to approach the capacity target value and causing the protection variable to approach the protection target value is satisfied, the protection variable is at least one of a discharge superheat degree, compressor temperature, discharge temperature, condensation temperature, evaporation temperature, high pressure, low pressure, and current, and when the discharge superheat degree is included in the protection variable, a larger rotation number out of the capacity rotation number and the protection rotation number corresponding to the discharge superheat degree is selected as a selected rotation number, and a minimum rotation number out of the selected rotation number and the protection rotation number corresponding to the protection variable other than the discharge superheat degree is selected as the control rotation number.

6. The refrigeration cycle apparatus according to claim 1, wherein:

the capacity target value is determined at a corresponding predetermined time, and the protection target value is determined at a corresponding predetermined time.

7. The refrigeration cycle apparatus according to claim 5, wherein:

the capacity target value is determined at a corresponding predetermined time, and the protection target value is determined at a corresponding predetermined time.

* * * * *

UNITED STATES PATENT AND TRADEMARK OFFICE
CERTIFICATE OF CORRECTION

PATENT NO. : 11,754,330 B2
APPLICATION NO. : 17/428978
DATED : September 12, 2023
INVENTOR(S) : Yuki Mori et al.

It is certified that error appears in the above-identified patent and that said Letters Patent is hereby corrected as shown below:

In the Specification

Column 6, Lines 21 to 24, the formula under [Expression 1] should appear as follows:

$$a(k) = Ka \times (output(k-1) - input2(k))$$
$$\varepsilon(k) = input1(k) - a(k)$$
$$output(k) = Kp \times input1(k) + Ki \times Ts \times \sum_{l=0}^{k} \varepsilon(l) \quad \cdots (1)$$

Signed and Sealed this
Seventh Day of November, 2023

Katherine Kelly Vidal
*Director of the United States Patent and Trademark Office*